(12) United States Patent
Takata

(10) Patent No.: US 8,007,122 B2
(45) Date of Patent: Aug. 30, 2011

(54) LIGHTING DEVICE FOR DISPLAY DEVICE AND DISPLAY DEVICE USING THE SAME

(75) Inventor: Yoshiki Takata, Suzuka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 12/764,292

(22) Filed: Apr. 21, 2010

(65) Prior Publication Data

US 2010/0202134 A1    Aug. 12, 2010

Related U.S. Application Data

(63) Continuation of application No. 11/911,741, filed as application No. PCT/JP2006/307064 on Apr. 3, 2006, now Pat. No. 7,731,376.

(30) Foreign Application Priority Data

Jun. 3, 2005 (JP) ................................ 2005-164223

(51) Int. Cl.
*G02F 1/13357* (2006.01)

(52) U.S. Cl. .................. 362/97.1; 362/311.04

(58) Field of Classification Search ........ 362/97.1–97.4, 362/311.04, 311.06

See application file for complete search history.

(56) References Cited

U.S. PATENT DOCUMENTS 7,731,376 B2 * 6/2010 Takata .................. 362/97.1

OTHER PUBLICATIONS

Takata; "Lighting device for display device and display device using the same"; U.S. Appl. No. 11/911,741, filed Oct. 17, 2007.

* cited by examiner

*Primary Examiner* — David V Bruce
(74) *Attorney, Agent, or Firm* — Keating & Bennett, LLP

(57) ABSTRACT

A backlight device includes a light guide plate opposed to fluorescent tubes, a diffusion sheet stacked on the light guide plate, and lens sheets further stacked on the diffusion sheet. A tip end of a corner portion of the diffusion sheet has a shape defined by removing a portion of the sheet along a straight line spanning between two sides constituting the corner portion. In first of the lens sheets, a tip end portion of a corner portion formed by two sides has a shape defined by removing a portion of the sheet in a larger amount than in the diffusion sheet by a circular arc which projects outward. In a second of the lens sheets, a tip end of a corner portion formed by two sides has a shape defined by removing a larger amount than in the first of the lens sheets along a straight line.

7 Claims, 7 Drawing Sheets

LIGHTING DEVICE FOR DISPLAY DEVICE AND DISPLAY DEVICE USING THE SAME

BACKGROUND OF THE INVENTION

1. Field of the Invention

The present invention relates to a lighting device for a display device which is used for a liquid crystal panel or the like, and a display device using the same.

2. Description of the Related Art

Japanese Patent Application Laid-Open No. 2004-125964 (FIG. 2) discloses a prior art backlight device for a liquid crystal display. In this backlight device, a plurality of optical films are stacked on each other and opposed to a housing portion of a light source such that light emission from the light source is uniformly irradiated to a display.

A backlight device has to include the plurality of optical sheets without omitting any of the sheets in its assembled state. However, a plurality of optical sheets usually appear to have the same or similar thin sheet shapes, and when they are seen from above in a stacked state, they cannot be discriminated from one another. Therefore, it is difficult to check for the presence of the plurality of optical sheets in the device. Thus, in the backlight device according to the above described prior art, the corner portion of each of the optical sheets is cut off along a straight line, and the cutoff amounts are made to differ in accordance with the respective sheets (the triangular shapes which are cut off from the respective sheets have the same or similar shapes to one another). The sheet with the smallest cutoff amount is on the bottom, and the sheets with larger cutoff amounts are sequentially stacked on top of one another. In this way, the cutoff portions are seen from above during the manufacturing process, so that the lack or absence of one or more of the optical sheets in the assembly is detected.

However, an optical sheet must have a minimum predetermined surface area for maintaining a light control function. Thus, the cutoff portion on each optical sheet must be as small as possible. Accordingly, it is still difficult to see the corner portions cut off along the straight lines and determine the absence of the optical sheets in the manufacturing process.

SUMMARY OF THE INVENTION

In order to overcome the problems described above, preferred embodiments of the present invention provide a lighting device for a display device in which the absence of one or more of a plurality of optical sheets can be easily detected, and a display device including such a lighting device.

A lighting device for a display device according to a preferred embodiment of the present invention includes a plurality of optical sheets each having corner portions and having a shape in which a tip end of the corner portion is removed along a line segment spanning between two sides constituting the corner portion, and a sheet layered body disposed near a light source defined by the plurality of the optical sheets being stacked on each other in an order of size of the remaining portions of the corner portions, the optical sheets having the largest remaining portion being the first in the stack or on the bottom of the stack, and wherein shapes of the line segments spanning between respective two sides constituting the corner portions of adjacent ones of the plurality of the optical sheets differ from each other.

With such a unique structure, if any one of the optical sheets is absent, the arrangement of the line segments differing in shape from one another becomes abnormal, and a sense of incompatibility the absence of one or more of the optical sheets can be visually detected instantly.

Other features, elements, steps, characteristics and advantages of the present invention will be described below with reference to preferred embodiments thereof and the attached drawings.

DETAILED DESCRIPTION OF THE PREFERRED EMBODIMENTS

First Preferred Embodiment

Figure 1:
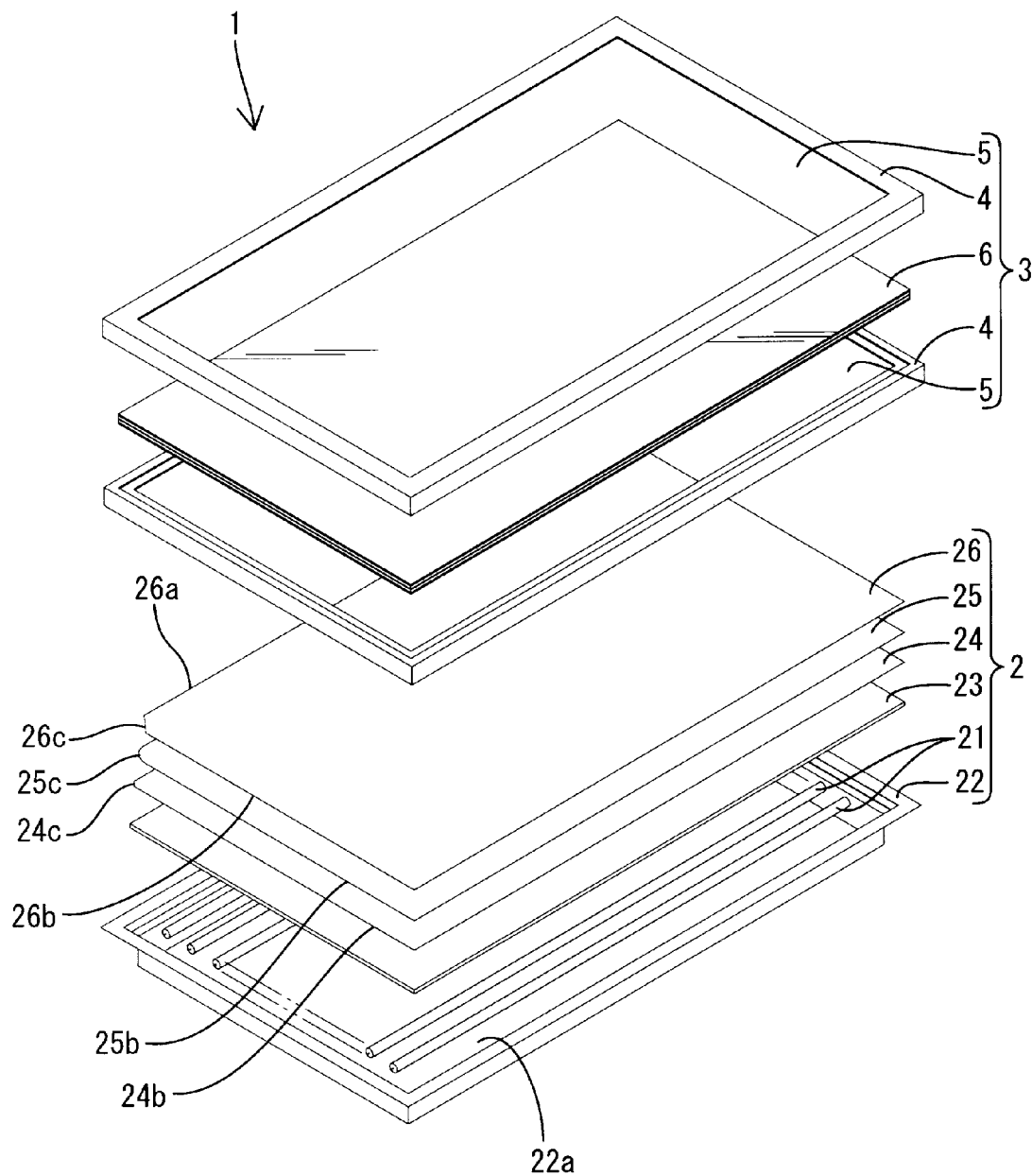
FIG. 1 is an exploded perspective view of a liquid crystal display according to a first preferred embodiment of the present invention.

A first preferred embodiment of the present invention will be described with reference to FIGS. 1, 2A and 2B. A liquid crystal display 1 according to this preferred embodiment is a display device, and preferably includes a backlight device 2, which is a lighting device for a display device, and a display panel 3, which is a display and is disposed in front of the backlight device 2 and capable of displaying images. The backlight device 2 preferably is a direct type backlight device including a tray 22 housing a plurality of fluorescent tubes 21, a light guide plate 23 made of a synthetic resin and disposed over the tray 22, a diffusion sheet 24 disposed on the light guide plate 23, and two lens sheets 25 and 26 further disposed on the diffusion sheet 24. However, the backlight device 2 is not limited to this configuration. As shown in FIG. 1, the diffusion sheet 24 and the lens sheets 25 and 26 are preferably optical sheets formed of a synthetic resin. Each of the optical sheets preferably has a substantially rectangular shape in the plane view, and a sheet layered body is defined by the plurality of optical sheets stacked on each other.

As shown in FIG. 1, a reflective sheet 22a is provided in the tray 22, and a plurality of fluorescent tubes 21 are located on the reflective sheet 22a. The respective fluorescent tubes 21 are disposed in parallel or substantially in parallel at equal or substantially equal spaces from one another in the tray 22, and are arranged in a plane configuration as a whole. Meanwhile, the display panel 3 includes a pair of glass boards 5 respectively fitted in frames 4, and a panel board 6 which is fitted between them and is constituted of a pair of transparent electrodes and an alignment layer containing liquid crystal.

Figure 2A:
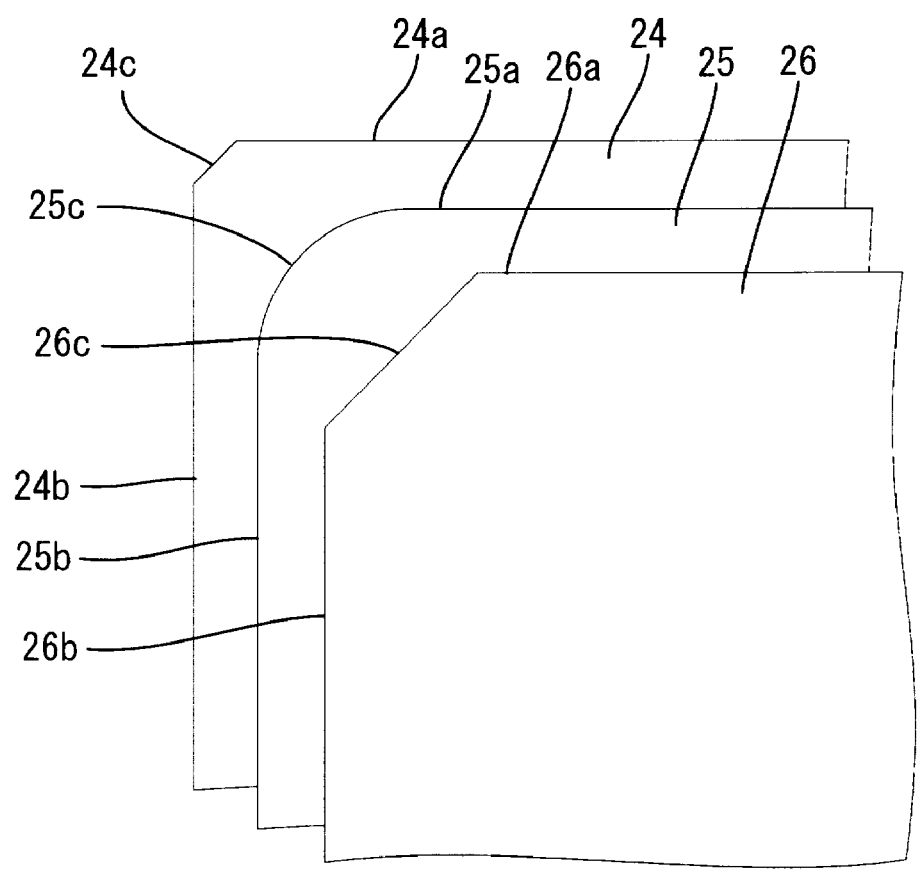
FIG. 2A is a plane view showing the state before stacking of a sheet layered body constituting the liquid crystal display shown in FIG. 1.
Figure 2B:
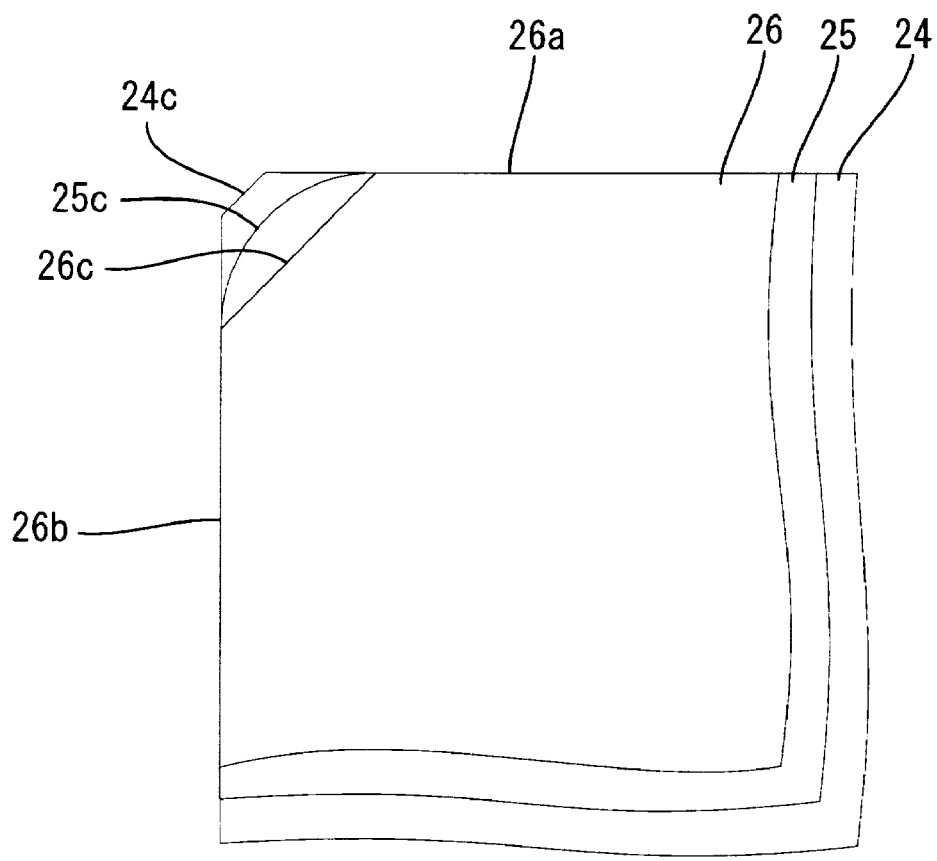
FIG. 2B is a plane view showing the stacked state of a sheet layered body shown in FIG. 2A.

As shown in FIG. 2A, each of the diffusion sheet 24 and the lens sheets 25 and 26 preferably has a shape such that a tip end of a corner portion located at one of its four corners is removed by a line segment spanning between two sides constituting the corner portion, and the shapes of the line segments differ from each other between the adjacent sheets 24 and 25, and between the adjacent sheets 25 and 26. Specifically, the diffusion sheet 24 preferably has a shape such that the tip end of the corner portion formed by two sides 24a and 24b among its outer sides is removed by a straight or substantially straight line 24c connecting the two sides 24a and 24b. The lens sheet 25 preferably has a shape such that the tip end of the corner portion formed by two sides 25a and 25b is removed by a circular or substantially circular arc 25c projected outward and connecting the two sides 25a and 25b. The lens sheet 26 preferably has a shape such that the tip end of the corner portion formed by two sides 26a and 26b is removed by a straight or substantially straight line 26c connecting the two sides 26a and 26b.

The line segments 24c and 26c which remove the tip ends of the corner portions of the sheets 24 and 26 are preferably arranged to define an angle of about 45° with respect to the outer sides 24a and 24b, and 26a and 26b of the sheets 24 and 26. However, the line segments 24c and 26c are not limited to this, and the circular or substantially circular arc 25c which removes the tip end of the corner portion of the sheet 25 is preferably formed by a quarter of the circumference of a circle with a predetermined radius. As shown in FIG. 2B, the diffusion sheet 24 and the lens sheets 25 and 26 are stacked in the order of the size of the removed portions, with the optical sheet having the smallest removed portion being the first sheet (in other words, they are stacked in the order of the size of the remaining portion, the largest remaining portion being stacked first or on the bottom of the stack). The end portions of the circular or substantially circular arc 25c of the lens sheet 25 are connected by the straight or substantially straight line 26c of the lens sheet 26 which is stacked on the lens sheet 25. The sheets 24, and 26 may be formed by actually cutting the corner portions of the sheet members which originally have the substantially rectangular shapes by the straight or substantially straight lines 24c and 26c and the circular or substantially circular arc 25c, respectively, or the sheets 24, 25 and 26 may be formed into the shapes in which the tip ends of the respective corner portions are originally removed by using molds.

According to this preferred embodiment, the shapes of the line segments 24c, 25c and 26c spanning between the two sides 24a and 24b, 25a and 25b, and 26a and 26b which constitute the corner portions of the diffusion sheet 24 and the lens sheets 25 and 26 differ from each other between the adjacent sheets. Therefore, if any one of these sheets 24, 25 and 26 which constitute the sheet layered body is absent, the arrangement of the line segments 24c, 25c and 26c differing in shapes from each other becomes irregular, and a sense of incompatibility is instantly visually detected. Therefore, the presence or absence of the sheets 24, 25 and 26 can be easily determined. Among the adjacent sheets, as for the one sheet 24 of the two adjacent sheets and the one sheet 26 of the two adjacent sheets, the two sides 24a and 24b, and the two sides 26a and 26b, which constitute the corner portions, are connected by the straight or substantially straight lines 24c and 26c, respectively. As for the other sheet 25, the two sides 25a and 25b constituting the corner portion are connected by the curved line (circular or substantially circular arc 25c), and thereby, the straight or substantially straight lines 24c and 26c are adjacent to the curved line 25c. Therefore, the absence of the sheets 24, 25 and 26 is detected more easily.

The lens sheet 25 of which two sides 25a and 25b constituting the corner portion are connected by the circular or substantially circular arc 25c so as to project outward is stacked on the diffusion sheet 24 of which two sides 24a and 24b constituting the corner portion are connected by the straight or substantially straight line 24c. The lens sheet 26 of which two sides 26a and 26b constituting the corner portion are connected by the straight or substantially straight line 26c is further stacked on the lens sheet 25, and the straight or substantially straight line 26c of the lens sheet 26 stacked on the lens sheet 25 is located at a position where the straight or substantially straight line 26c connects the end portions of the circular or substantially circular arc 25c. Thereby, even when the three sheets 24, 25 and 26 are laid on one another, the circular or substantially circular arc 25c and the straight or substantially straight line 26c do not overlap each other, and they can be clearly discriminated. The straight or substantially straight line 26c is not located deeply inward away from the circular or substantially circular arc 25c, and the removed width of the corner portion of the sheet 26 located on the top is not large. Therefore, a compact and lightweight backlight device 2 can be provided. Further, by disposing the display panel 3 in front of the backlight device 2, the liquid crystal display 1 in which the presence or absence of the sheets 24, 25 and 26 can be easily determined can be provided.

Second Preferred Embodiment

Figure 3A:
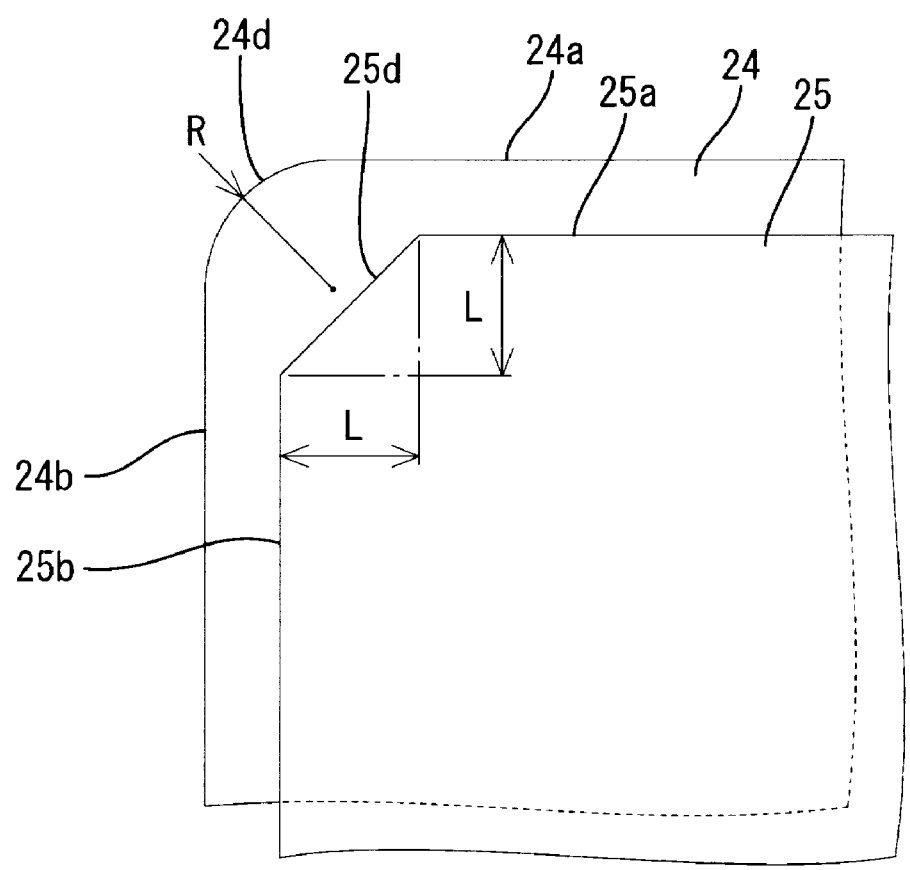
FIG. 3A is a plane view showing the state before stacking of a sheet layered body according to a second preferred embodiment of the present invention.
Figure 3B:
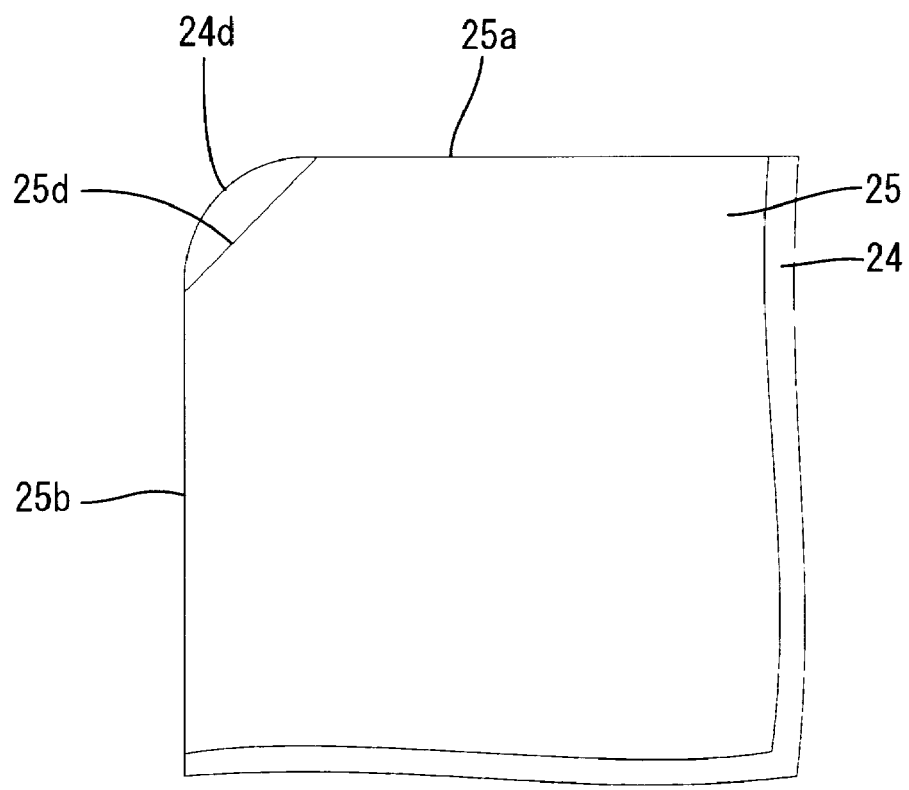
FIG. 3B is a plane view showing the stacked state of a sheet layered body shown in FIG. 3A.

Next, a second preferred embodiment of the present invention will be described with reference to FIGS. 3A and 3B. In this preferred embodiment, the lens sheet 25 preferably has a shape such that the tip end of the corner portion is removed by a straight or substantially straight line 25d which connects the outer sides 25a and 25b and forms an angle of about 45° relative to the sides 25a and 25b, is stacked on the diffusion sheet 24 such that the tip end of the corner portion is removed by a circular or substantially circular arc 24d formed by a quarter of the circumference which connects the two sides 24a and 24b constituting the corner portion and is projected outward. This preferred embodiment may be applied to the lens sheets 25 and 26. As shown in FIG. 3A, a length L in the diagonal direction of the straight or substantially straight line 25d of the lens sheet 25 is longer than a radius R of the circular or substantially circular arc 24d formed in the diffusion sheet 24, and the length of the straight or substantially straight line 25d is longer than the length of the shortcut of the end portions of the circular or substantially circular arc 24d (shown in FIG. 3B). In this preferred embodiment, the corner portion of the lens sheet 26 which is stacked on the sheet 25 is cut by a circular or substantially circular arc or a straight or substantially straight line so as not to overlap the straight or substantially straight line 25d. The sheets 24 and 25 may be formed by actually cutting the corner portions of the sheet members which originally have the substantially rectangular shapes by the circular or substantially circular arc 24d and the straight or substantially straight line 25d, respectively, or the sheets 24 and 25 may be formed into the shapes in which the tip ends of the respective corner portions are originally removed by using molds.

According to this preferred embodiment, the lens sheet 25 of which two sides 25a and 25b constituting the corner portion are connected by the straight or substantially straight line 25d is stacked on the diffusion sheet 24 of which two sides 24a and 24b constituting the corner portion are connected by the circular or substantially circular arc 24d so as to project outward, and the length of the straight or substantially straight line 25d is larger than the length of the shortcut of the end portions of the circular or substantially circular arc 24d. Therefore, in the adjacent sheets 24 and 25, the straight or substantially straight line 25d and the circular or substantially circular arc 24d do not overlap each other, and can be clearly discriminated, and therefore, the absence of the sheets 24 and 25 can be detected more easily.

Third Preferred Embodiment

Figure 4A:
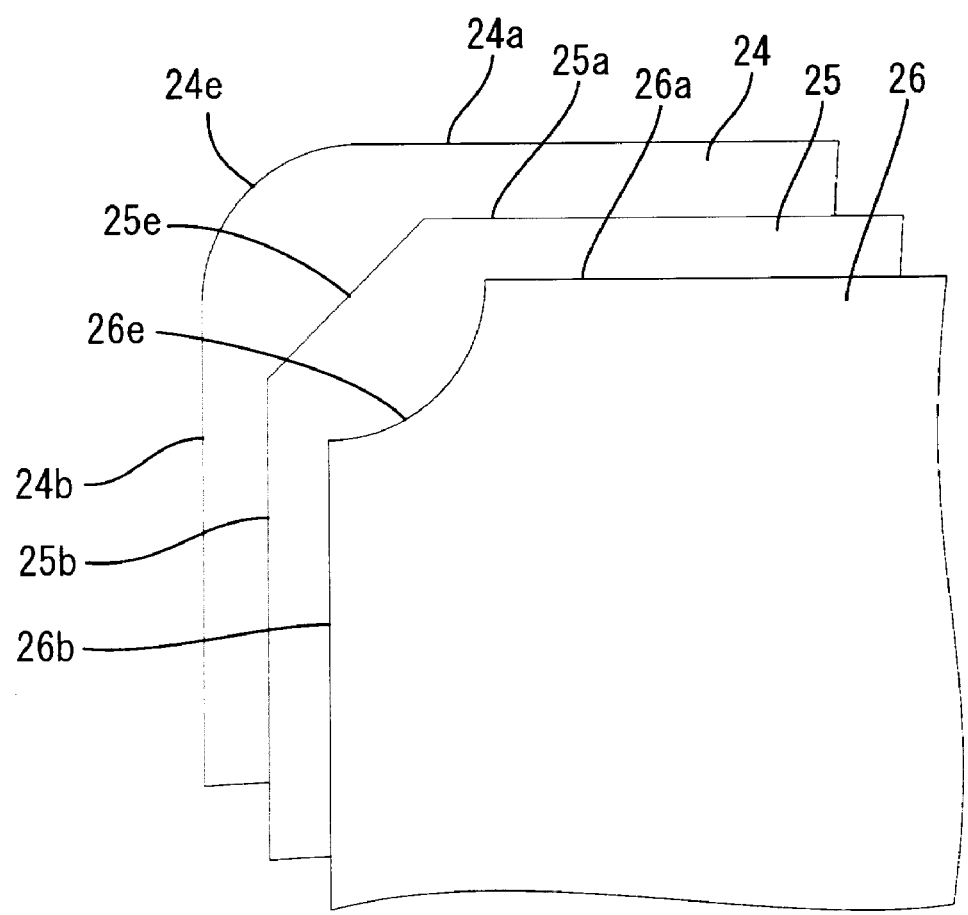
FIG. 4A is a plane view showing the state before stacking of a sheet layered body according to a third preferred embodiment 3.
Figure 4B:
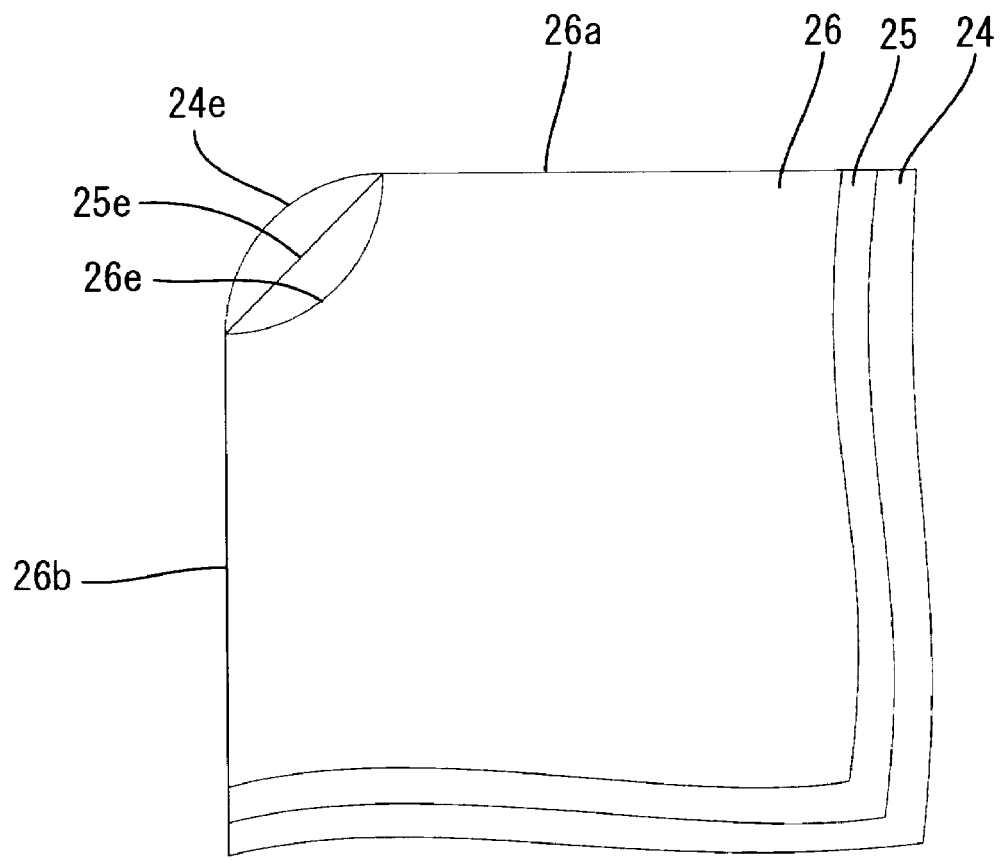
FIG. 4B is a plane view showing the stacked state of a sheet layered body shown in FIG. 4A.

FIGS. 4A and 4B show a third preferred embodiment of the present invention. In this preferred embodiment, the lens sheet 25 preferably has a shape such that the tip end of the corner portion is removed by a straight or substantially straight line 25e which connects the outer sides 25a and 25b and defines an angle of about 45° with respect to the sides 25a and 25b, is stacked on the diffusion sheet 24 such that the tip end of the corner portion is removed by a circular or substantially circular arc 24e by a quarter of the circumference which connects the two sides 24a and 24b constituting the corner portion and is projected outward. Further, the lens sheet 26 preferably has a shape such that the tip end of the corner portion is removed by a circular or substantially circular arc 26e (the radius is preferably the same as that of the circular or substantially circular arc 24e) by a quarter of the circumference which connects the two sides 26a and 26b constituting the corner portion and is recessed inward is stacked on the lens sheet 25. As shown in FIG. 4B, in this preferred embodiment, the positions of the end portions of the circular or substantially circular arcs 24e and 26e of the diffusion sheet 24 and the lens sheet 26 correspond to each other, and the straight or substantially straight line 25e of the lens sheet 25 is formed to connect these end portions. The sheets 24, 25 and 26 may be formed by actually cutting the corner portions of the sheet members which originally has the substantially rectangular shapes, by the circular or substantially circular arcs 24e and 26e and the straight or substantially straight line 25e, respectively, or the sheets 24, 25 and 26 may be formed into the shapes with the tip ends of the respective corner portions originally removed by using molds.

According to this preferred embodiment, the lens sheet 25 of which two sides 25a and 25b constituting the corner portions are connected by the straight or substantially straight line 25e is stacked on the diffusion sheet 24 in which the two sides 24a and 24b constituting the corner portion are connected by the circular or substantially circular arc 24e to project outward. Further, the lens sheet 26 of which two sides 26a and 26b constituting the corner portion are connected by the circular or substantially circular arc 26e so as to recess inward is stacked on the lens sheet 25. The positions of the end portions of the circular or substantially circular arcs 24e and 26e correspond to each other, and the straight or substantially straight line 25e is located at the position at which it connects these end portions. Thereby, in the corner portions of the sheets 24, 25 and 26, the two circular or substantially circular arcs 24e and 26e and the straight or substantially straight line 25e form one closed pattern, and therefore, the absence of the sheets 24, 25 and 26 can be easily detected at a glance.

Other Preferred Embodiments

The present invention is not limited to the preferred embodiments described above and illustrated in the drawings, but, for example, the following preferred embodiments are also included in the technical scope of the present invention.

The optical sheets in the lighting device for a display device according to various preferred embodiments of the present invention preferably include all light adjusting sheets such as light guide plates, and reflective sheets.

The lighting device for a display device according to various preferred embodiments of the present invention is also applicable to a side light type.

Cold-cathode tubes, hot-cathode tubes, discharge lamps and the like are applicable to the light source of the lighting device of a display device according to various preferred embodiments of the present invention.

In the lighting device of a display device according to various preferred embodiments of the present invention, the curved lines other than a circular or substantially circular arc, or the straight or substantially straight lines other than that which defines an angle with respect to the outer sides of the sheet being about 45° may be applied to the line segment by which the corner portion is cut.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A lighting device for a display device, comprising:
   a plurality of optical sheets each having corner portions and each having a shape in which a tip end of one of the corner portions is removed along a line segment spanning between two sides constituting said one of the corner portions so as to produce a remaining portion;
   a sheet layered body including the plurality of optical sheets and through which light from a light source passes; wherein
   shapes of the line segments spanning between respective two sides constituting the corner portions of adjacent ones of the plurality of optical sheets differ from each other.

2. The lighting device for a display device according to claim 1, wherein one of the shapes of the line segments of one of the adjacent ones of the plurality of optical sheets is a substantially straight line, and another of the shapes of the line segments of another of the adjacent ones of the plurality of optical sheets is a substantially curved line.

3. The lighting device for a display device according to claim 2, wherein said optical sheet having the line segment that is a substantially straight line and said optical sheet having the line segment that is a substantially curved line are arranged such that the line segments thereof are off from each other.

4. The lighting device for a display device according to claim 2, wherein the remaining portion of the another of the adjacent ones of the plurality of optical sheets is defined by the substantially curved line and projects outward beyond said optical sheet having the line segment that is a substantially straight line.

5. The lighting device for a display device according to claim 2, wherein the remaining portion of the one of the adjacent ones of the plurality of optical sheets is defined by the substantially straight line and projects outward beyond said optical sheet having the line segment that is a substantially curved line.

6. The lighting device for a display device according to claim 2, wherein the remaining portion of the one of the adjacent ones of the plurality of optical sheets is defined by the substantially straight line and projects outward beyond said optical sheet having the line segment that is a substantially curved line, and the remaining portion of the another of the adjacent ones of the plurality of optical sheets is defined by the substantially curved line and projects outward beyond another of said optical sheets having the line segment that is a substantially straight line.

7. A display device, comprising:
   the lighting device for a display device according to claim 1; and
   a display disposed in front of the lighting device for a display device.

* * * * *